April 25, 1933.  F. R. SUNDLING  1,906,017
AIRPLANE
Filed March 18, 1932  3 Sheets-Sheet 1
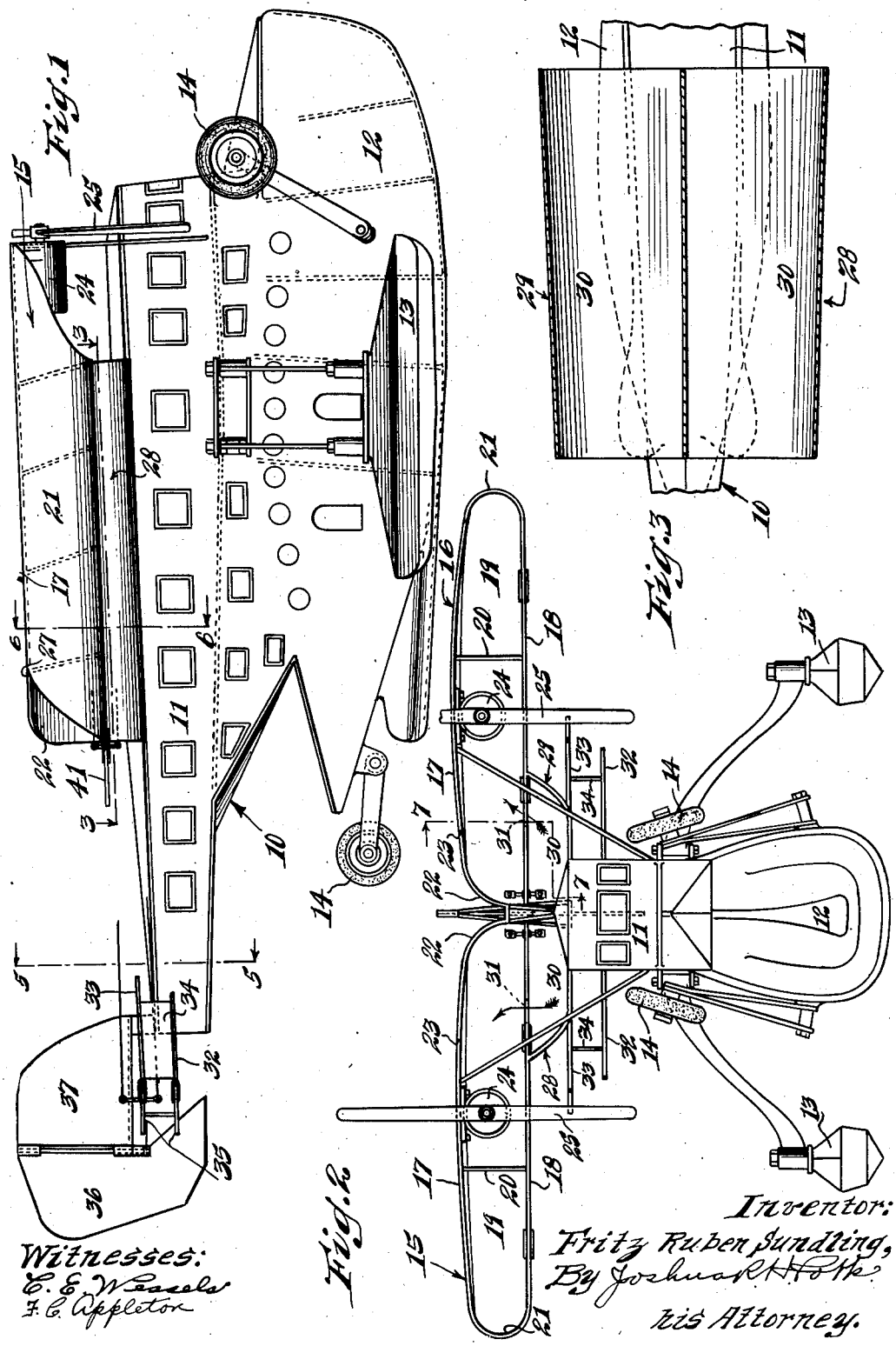
Witnesses:
Inventor:
Fritz Ruben Sundling,
By his Attorney.

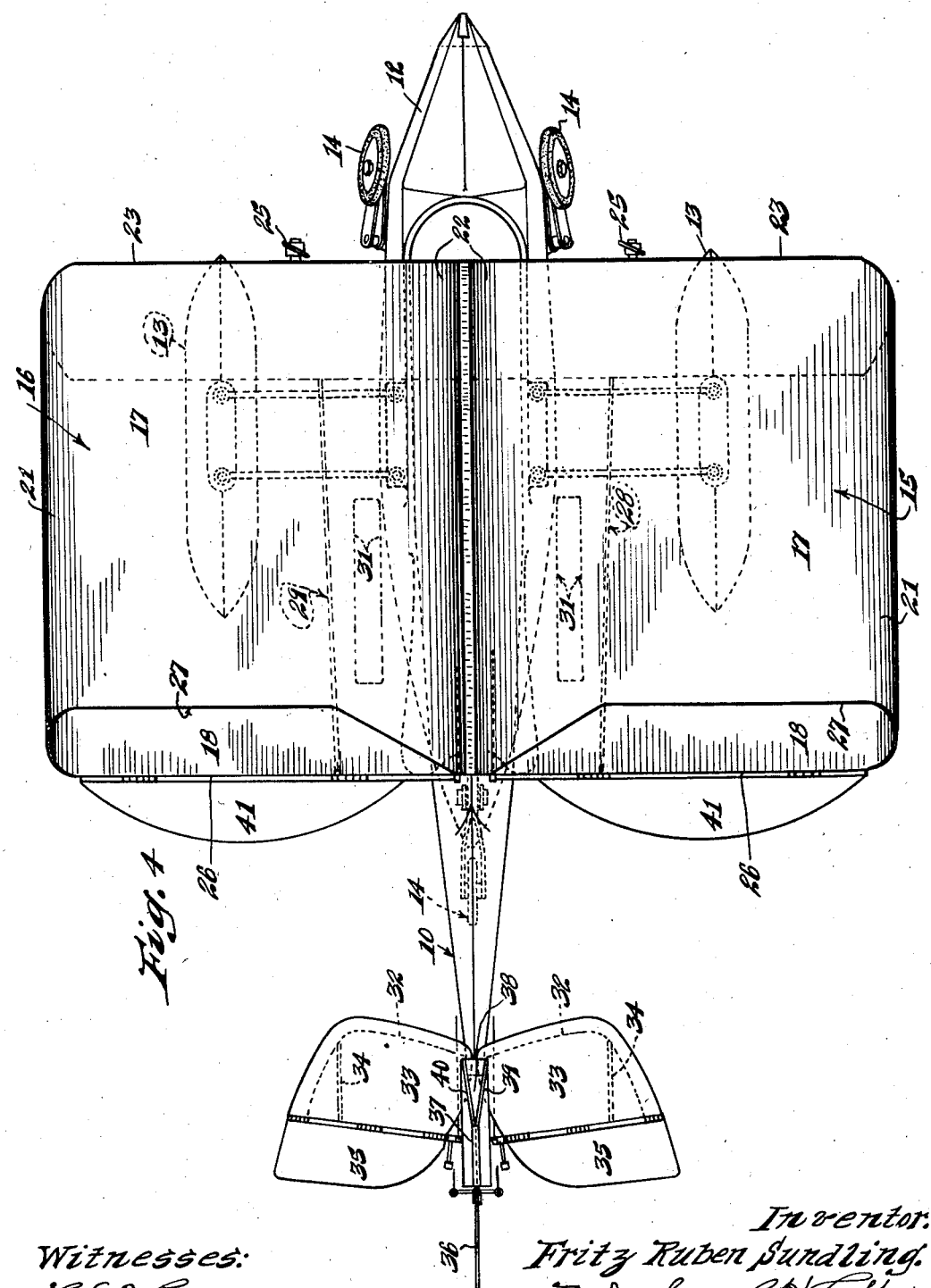

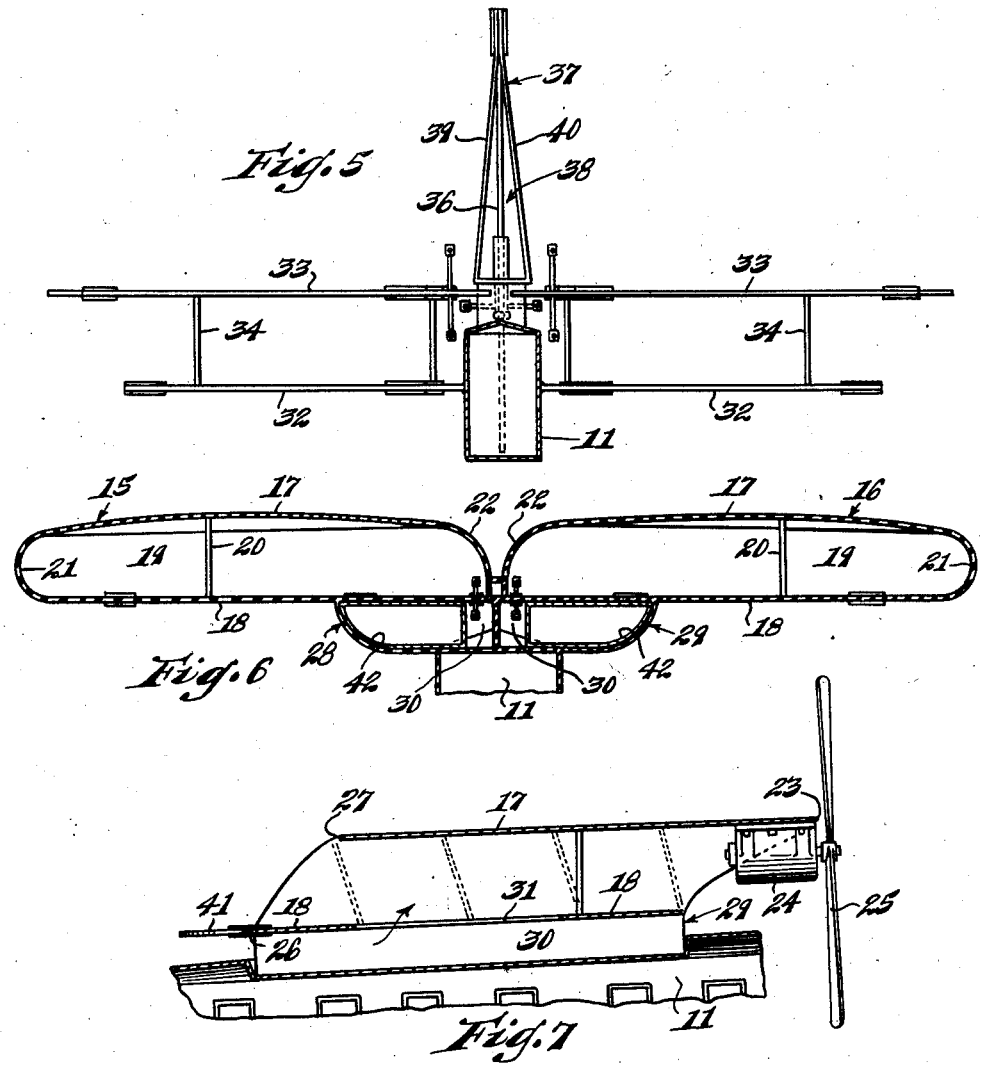

Patented Apr. 25, 1933

1,906,017

UNITED STATES PATENT OFFICE

FRITZ RUBEN SUNDLING, OF CHICAGO, ILLINOIS, ASSIGNOR OF ONE-FOURTH TO ALBERT JOHN CHRISTENSON, OF CHICAGO, ILLINOIS

AIRPLANE

Application filed March 18, 1932. Serial No. 599,636.

This invention relates to airplanes, and particularly an improved airplane wing construction in the form of tubular wing members possessing numerous advantages over previous types.

An object of the invention is the provision of an improved airplane construction employing tubular wings by means of which greater lifting properties are obtained, as well as improved results in sustained flight under normal atmospheric conditions, and also when encountering air pockets. By means of the present invention the length of the wings is greatly reduced, which results in a great decrease in hangar space. This substantial reduction of the wing spread facilitates ease of handling and manipulation, and also reduces liability of encountering dangerous objects in flight. A further object of the invention is the provision of main tubular wing members and auxiliary tubular members cooperating to enhance the lifting power and maintain smoothness in flight.

Other objects will appear hereinafter.

The invention consists in the combinations and arrangements of parts hereinafter described and claimed.

The invention will be best understood by reference to the accompanying drawings, forming a part of this specification, and in which:

Fig. 1 is a side elevation of an airplane constructed in accordance with the present invention;

Fig. 2 is a front elevational view of the structure shown in Fig. 1;

Fig. 3 is a horizontal sectional view, taken substantially on the line 3—3 of Fig. 1;

Fig. 4 is a top plan view;

Fig. 5 is a vertical sectional view, taken substantially on the line 5—5 of Fig. 1;

Fig. 6 is a vertical sectional view, taken substantially on the line 6—6 of Fig. 1; and Fig. 7 is a vertical longitudinal sectional view of the construction, taken substantially on the line 7—7 of Fig. 2.

As illustrated in the drawings, the preferred embodiment of the invention comprises a main fuselage 10 which, in the preferred illustrative construction, includes an upper passenger carrying section 11 and a lower freight or commodity section 12. It will be understood that the present invention is not necessarily restricted to this character of airplane, but may be advantageously employed in connection with any type. The particular type of airplane disclosed is equipped with swingably mounted pontoons 13 for balancing purposes in landing and taking off when the airplane is used as a hydroplane, and is also equipped with retractible wheels or landing gear 14 for use on land. The landing gear and pontoons form no part of the invention of the present application, but is covered in a copending application, Serial No. 599,637, filed of even date herewith, and will therefore not be described in detail herein.

Extending laterally from a point preferably adjacent the upper surface of the fuselage is a right wing member 15 and a left wing member 16 which are identical in general construction except in reverse position. Each wing member is tubular or hollow in a direction longitudinally of the airplane, and each therefore comprises an upper shell or frame member 17 and a lower shell or frame member 18 suitably spaced to provide a tubular air passageway 19. It will be understood that the general framework as well as the wing and other portions may be constructed of wood or metal covered with cloth fabric. The upper and lower frame members 17 and 18 may be connected to brace members 20, and, as particularly shown in Figs. 2 and 6, merge in an outer curved portion 21 to complete the tubular formation, and also merge adjacent the longitudinal center line of the airplane in the curved portion 22. As shown in Figs. 1, 4, and 7, the upper frame member 17 extends a considerable distance in advance of the lower frame member 18 to provide a leading edge 23, and by this construction and arrangement the driving motors 24 carrying the propellers 25 may be conveniently mounted on the under surface of the upper frame member 17, as shown. The forward projection of the upper frame member 17 with relation to the lower frame members 18 is approximately one-fourth of the entire width of the wings, and in addition to this projection, the rear edge 26 of each lower member 18 projects or extends rearwardly relative to the rear edge 27 of each upper member 17. By this construction and arrangement the leading edge 23 cuts the air stream in advance of the forward edge of the lower member 18, permitting a relatively large volume of air to be received and compressed during passage through the air passageways 19, and released rearwardly and upwardly between the rear edges 26 and 27, resulting in greater lifting power.

Mounted beneath the right and left wings 15 and 16, respectively, are auxiliary air receiving members 28 and 29, respectively, which are considerably smaller in cross-sectional area and disposed adjacent the upper surface of the fuselage, as clearly shown in Fig. 2. These members are substantially equal in length to the width in a longitudinal direction of the lower frame members 18, but they preferably taper in a rearward direction, as especially shown in Figs. 3 and 4, for the purpose of creating a congestion of air in the interior air passageways 30. To obtain improved results, these auxiliary tubular members are preferably provided on the upper surface with longitudinally extending slots 31 which communicate with the wing air passageways 19, allowing the congested air accumulating in the passageways 30 to pass upwardly within the passageways 19 to enhance and increase the lifting properties.

Cooperating with the wing members and also with the auxiliary members described are a pair of tail planes comprising a lower rigidly mounted tail plane member 32 and an upper rigidly mounted tail plane member 33, the latter being slightly greater in horizontal area than the lower member 32, as shown in Figs. 4 and 5. Members 32 and 33 are arranged in parallel planes but incline rearwardly and downwardly, as shown in Fig. 1. Also between members 32 and 33 there is preferably interposed partitions 34 lying in vertical planes parallel to a vertical plane passing through the longitudinal center line of the airplane proper. As shown in Fig. 5, partitions 34 are mounted adjacent the outer edges of the members 32 and 33.

The rear edges of the upper members 32 are disposed at an angle relative to the longitudinal center line of the airplane, as shown in Fig. 4, to support the hingedly mounted elevators 35. By this construction and arrangement the hinge lines converge, looking from the front of the airplane, so that when the elevators 35 are operated the air stream is forced inwardly to bring into action an increased air volume upon the rudder 36. To improve this operation, the tail fin 37 is also of tubular or hollow construction to afford a longitudinal air passageway 38. In the preferred construction the tail fin 37, upon which the rudder 36 is pivotally mounted, is composed of a pair of side members 39 and 40, which are connected adjacent the upper edges but diverge downwardly, as shown in Fig. 5. The mounting of the fin 37 is such that the air stream passing through the passageway 38 is centrally cut by the forward edge of the rudder 36, which tends to increase stability and ease of operation. Ailerons 41 may be pivotally mounted upon the rear edge portions of the lower frame members 18, as shown in Figs. 1 and 4. Operating means for the elevators 35, rudder 36, and ailerons 41, are not shown, inasmuch as standard equipment may be utilized for this purpose.

In the preferred construction the distance between each upper frame member 17 and the associated lower frame member 18 is equal approximately to one-fifth or one-sixth of the lateral length of the wing, although it is to be understood that the invention is not necessarily limited to these proportions.

Instead of utilizing the auxiliary air receiving members 28 and 29 in the manner described, gas containers 42, as shown in section in Fig. 6, may be inserted in these members to increase the lifting properties and facilitate landing and taking off. These gas containers may be constructed of rubber or suitable leakproof fabric material filled with helium gas or an equivalent.

The construction is highly efficient and durable in use, is economical to manufacture, results in a greater reduction of space necessary to house and manipulate, and results in increased economy in flight.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. The combination in an airplane, of a fuselage, a pair of laterally extending wings of tubular formation providing air passageways extending in a direction longitudinally of the fuselage center line, and a pair of transversely restricted auxiliary tubular air receiving members mounted adjacent the median longitudinal line of the plane and cooperatively beneath said wings, said auxiliary tubular members communicating between their ends laterally with the superposed tubular wing portions.

2. The combination in an airplane, of a fuselage, a pair of laterally extending wings of tubular formation providing air passageways extending in a direction longitudinally of the fuselage center line, and a pair of auxiliary tubular air receiving members mounted adjacent said wings, said auxiliary members provided with slots communicating with said wings.

3. The combination in an airplane, of a fuselage, a pair of laterally extending wings of tubular formation providing air passageways extending in a direction longitudinally of the fuselage center line, tail plane members mounted upon the tail of said fuselage, a rudder mounted upon the tail extremity, elevators pivotally mounted upon said tail plane members at angles converging inwardly, and a longitudinally tubular tail fin mounted upon said fuselage tail in advance of said rudder.

4. The combination in an airplane, of a fuselage, a pair of laterally extending wings of tubular formation providing air passageways extending in a direction longitudinally of the fuselage center line, and a pair of auxiliary tubular air receiving members mounted adjacent said wings, said auxiliary tubular members convergingly tapering in a rearward direction.

5. The combination in an airplane, of a fuselage, a pair of laterally extending wings of tubular formation providing air passageways extending in a direction longitudinally of the fuselage center line, and a pair of auxiliary tubular air receiving members mounted adjacent said wings, said auxiliary members provided with slots communicating with said wings, said auxiliary tubular members convergingly tapering in a rearward direction.

6. The combination in an airplane, of a fuselage, a pair of laterally extending wings of tubular formation providing air passageways extending in a direction longitudinally of the fuselage center line, tail plane members mounted upon the tail of said fuselage, a rudder mounted upon the tail extremity, elevators pivotally mounted upon said tail plane members at angles converging inwardly, and a pair of auxiliary tubular air receiving members mounted adjacent said wings.

7. The combination in an airplane, of a fuselage, a pair of laterally extending wings of tubular formation providing air passageways extending in a direction longitudinally of the fuselage center line, tail plane members mounted upon the tail of said fuselage, a rudder mounted upon the tail extremity, elevators pivotally mounted upon said tail plane members at angles converging inwardly, a longitudinally tubular tail fin mounted upon said fuselage tail in advance of said rudder, and a pair of auxiliary tubular air receiving members mounted adjacent said wings.

8. The combination in an airplane, of a fuselage, a pair of laterally extending wings connected to said fuselage and each consisting of an upper frame member and a lower frame member spaced to provide a longitudinally extending air passageway, said upper and lower members merging at their inner and outer extremities, and a pair of auxiliary tubular air receiving members mounted adjacent said wings, said auxiliary members provided with slots communicating with said wings.

9. The combination in an airplane, of a fuselage, a pair of laterally extending wings connected to said fuselage and each consisting of an upper frame member and a lower frame member spaced to provide a longitudinally extending air passageway, said upper and lower members merging at their inner and outer extremities, tail plane members mounted upon the tail of said fuselage, a rudder mounted upon the tail extremity, and elevators pivotally mounted upon said tail plane members at angles converging inwardly.

10. The combination in an airplane, of a fuselage, a pair of laterally extending wings of tubular formation providing air passageways extending in a direction longitudinally of the fuselage center line, tail plane members mounted upon the tail of said fuselage, a rudder mounted upon the tail extremity, and elevators pivotally mounted upon said tail plane members at angles converging inwardly, said tail plane members arranged in parallel relationship and inclined downwardly and rearwardly.

11. The combination in an airplane, of a median fuselage, a pair of laterally extending wings connected to said fuselage, each wing consisting of an upper horizontal frame member and a lower horizontal frame member spaced to provide a longitudinally extending open-ended passageway, said upper and lower frame members merging roundingly at their inner and outer lateral extremities, and a pair of parallel longitudinal transversely restricted auxiliary tubular air receiving members located on opposite sides of the median longitudinal axis of the fuselage beneath said wings and comprising frames merging at their outer lateral extremities with the lower frame members of the wings, said auxiliary tubular members communicating between their front and rear ends laterally with the superposed wing passageways.

In testimony whereof I have signed my name to this specification.

FRITZ RUBEN SUNDLING.